(12) United States Patent
Hertlein

(10) Patent No.: US 9,905,021 B2
(45) Date of Patent: Feb. 27, 2018

(54) PROCESSING IMAGING DATA

(71) Applicant: Thomas Hertlein, Erlangen (DE)

(72) Inventor: Thomas Hertlein, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 368 days.

(21) Appl. No.: 14/684,676

(22) Filed: Apr. 13, 2015

(65) Prior Publication Data

US 2015/0302610 A1 Oct. 22, 2015

(30) Foreign Application Priority Data

Apr. 16, 2014 (DE) .................. 10 2014 207 351

(51) Int. Cl.
| | | |
|---|---|---|
| *G06F 21/62* | (2013.01) | |
| *G06T 7/40* | (2017.01) | |
| *G06T 11/60* | (2006.01) | |
| *G06T 7/90* | (2017.01) | |

(52) U.S. Cl.
CPC .......... *G06T 7/408* (2013.01); *G06F 21/6254* (2013.01); *G06T 7/90* (2017.01); *G06T 11/60* (2013.01); *G06T 2207/30176* (2013.01)

(58) Field of Classification Search
CPC .............. G06F 21/602; G06F 21/6254; H04N 21/4542; H04N 21/835; H01L 27/14609; H01L 27/14603; H01L 27/1463; G09C 5/00; G06K 9/00026; G06K 9/48; G06T 7/408; G06T 7/90; G06T 11/60; G06T 2207/30176

See application file for complete search history.

(56) References Cited

U.S. PATENT DOCUMENTS

| | | | | |
|---|---|---|---|---|
| 4,680,805 A | * | 7/1987 | Scott ................ | G06K 9/48 382/197 |
| 5,585,732 A | * | 12/1996 | Steele .............. | G01N 33/46 324/663 |
| 2008/0204788 A1 | * | 8/2008 | Kelly ............... | G06T 11/60 358/1.15 |

OTHER PUBLICATIONS

German Office Action dated Jan. 19, 2015 for corresponding German Patent No. DE 10 2014 207 351.0 with English translation.
Jähne B.; "Digitale Bildverarbeitung and Bildgewinnung," Springer Vieweg Verlag; 7., neu bearbeitete Auflage, pp. 555-567, 586 (2012).

* cited by examiner

*Primary Examiner* — Brian F Shaw
(74) *Attorney, Agent, or Firm* — Lempia Summerfield Katz LLC

(57) ABSTRACT

A method is provided for processing image data, wherein the image data are given by an image bitmap including pixels, wherein each pixel has exactly one pixel color value. Regions including pixels having a prespecifiable first color value and a prespecifiable maximum pixel spacing are overwritten by a rectangle having a prespecifiable second color value. This method advantageously allows for anonymization of selected image data on the basis of pixel color values to be carried out. The method may be used universally, independently of the form of the information to be anonymized (e.g., embedded texts, tables, images).

11 Claims, 4 Drawing Sheets

PROCESSING IMAGING DATA

CROSS-REFERENCE TO RELATED APPLICATIONS

This application claims the benefit of DE 10 2014 207 351.0, filed on Apr. 16, 2014, which is hereby incorporated by reference in its entirety.

TECHNICAL FIELD

The embodiments relate to a method for processing image data.

BACKGROUND

In electronic data processing, information is not only captured and passed on in text documents, but increasingly also in the form of image data. Frequently, information that is confidential, and is made unrecognizable before it is passed on to a third party or before it may be published, is embedded in the image data. It is provided here that the data is not stored in the underlying document file. To this end, the file of the image data may be processed manually with a suitable image processing program. After the image data file is opened with the image processing program, the relevant image regions are, for example, blackened or cut out with suitable functions of the image processing program. The process ends by storing the image data in a document file again.

SUMMARY AND DESCRIPTION

The scope of the present invention is defined solely by the appended claims and is not affected to any degree by the statements within this summary. The present embodiments may obviate one or more of the drawbacks or limitations in the related art.

It is the object of the present embodiments to indicate a method for processing image data.

The image data considered in the present specification is given in the form of image pixel data. Image pixel data represent all the image information that is represented visibly on the screen when an image is opened. What is known as image metadata stored together with the image data on a data carrier, such as for example a timestamp of the image recording, GPS data, or identification data of an image camera, is not the subject matter described herein. Anonymization of image data with respect to facial recognition or anonymization of data via text processing programs, such as, for example, Word or Adobe Acrobat, are likewise not considered.

A method is provided for processing image data, wherein the image data are given by an image bitmap including pixels, wherein each pixel has exactly one pixel color value. Regions having pixels having a prespecifiable first color value and a prespecifiable maximum pixel spacing are overwritten here by a rectangle having a prespecifiable second color value. This method advantageously allows for anonymization of selected image data on the basis of pixel color values to be carried out. The method may be used universally, independently of the form of the information to be anonymized (e.g., embedded texts, tables, images). Furthermore, the method allows automated performance of the anonymization of image data in real time.

In certain embodiments, the method for processing image data may be performed for reasons of encryption and/or security. In other words, the method for processing image data may be a method for encrypting image data in order to hide sensitive image data from the view of unauthorized persons.

The pixel spacing may indicate in an advantageous manner the row and column spacing of the pixels having the first color value.

In one embodiment, the method includes the following acts. In one act, row-and column-wise searching of the image bitmap for pixel regions takes place in which at least one pixel with the first color value appears, wherein a pixel region is defined in that the spacing between two pixels having the first color value is less than a prespecifiable first value. In another act, when a pixel region with the first color value is found, a first rectangle is constructed that completely encloses the pixel region. The two method acts are repeated until the image bitmap has been completely searched. Subsequently, overlapping first rectangles are combined to form second rectangles until no further overlaps of first rectangles exist. Subsequently, overlapping second rectangles are combined to form third rectangles until no further overlaps of second rectangles exist. This method procedure of combining overlapping rectangles is continued until no further overlaps of rectangles exist. In an additional act, overwriting the pixel color values of the ultimately obtained rectangles with the second color value takes place.

In one embodiment, the spacing from the borders of the first rectangle to the borders of the pixel region may take a prespecifiable second value.

In a particular embodiment, the pixel color value may be given by an ARGB color value. Thereby, the method may be applied advantageously to the widely used ARGB color scheme.

DETAILED DESCRIPTION

Figure 1A:
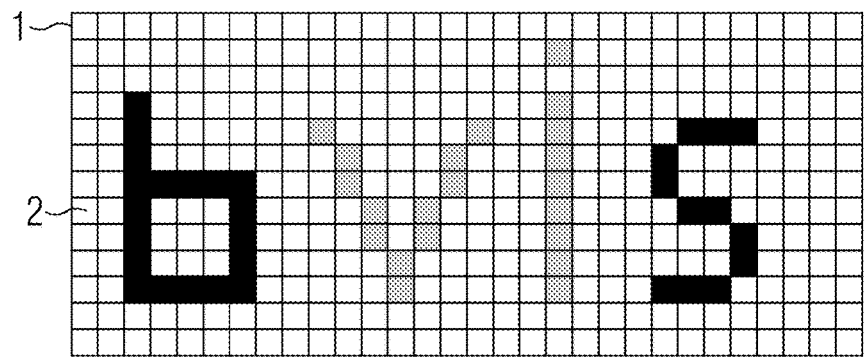
FIG. 1a-1c depict a schematic image of a method for processing image data.
Figure 1B:
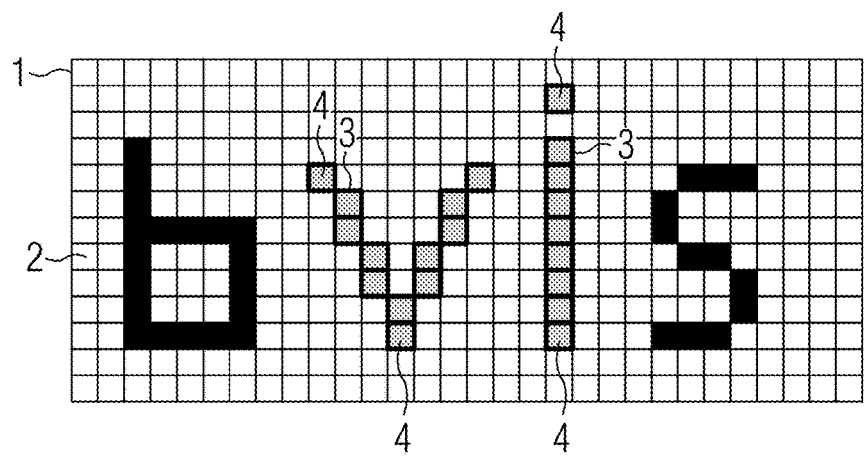
Figure 1C:
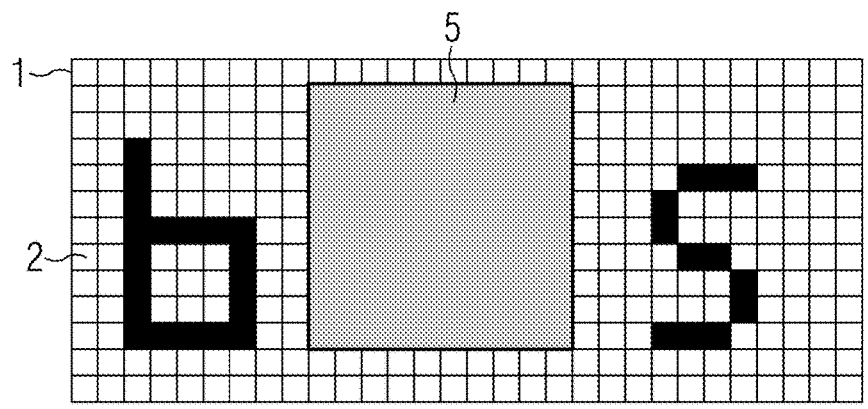

FIGS. 1a to 1c depict a schematic image of a method for processing image data. An image bitmap 1 with N×M pixels 2 is depicted, the color and transparency values of which are given by an ARGB color code. The ARGB color code here expresses the transparency and the color of a pixel. The underlying ARGB color scheme is coded via four bytes, wherein byte 1 gives the Alpha Channel (A; transparency, value region 0-255), byte 2 gives the red value (R; value region 0-255), byte 3 gives the green value (G; value region 0-255) and byte 4 gives the blue value (B; value region 0-255). In the image bitmap 1, some pixels 2 have a first color value, which is given in the illustrated exemplary embodiment by the ARGB color code for the color light-gray. In FIG. 1a, two text letters "b" and "s" are coded in black color, and the letters "v" and "i" are coded in the first color value. The object is now to identify in the image bitmap 1 the pixels 2 having the first color value and to override them by a rectangle having a prespecifiable second color value. The pixels 2 to be overwritten are identified using a prespecifiable maximum pixel spacing. The pixel spacing here gives the row and column spacing of the pixels 2 having the first color value. In the exemplary embodiment illustrated, the maximum pixel spacing is chosen as the value 2. The image map 1 is now searched in a row- and column-wise manner for pixels 2 that have the first color value and whose row and column spacing is at most two pixels. The pixels 2 ascertained in this way are marked in FIG. 1b by a pixel marking 3 in the form of a boundary. The pixels 2 with one pixel marking 3 are combined to form one region. Subsequently, the outermost left, right, upper ,and lower boundaries 4 of the formed region are ascertained and defined as corners of the rectangle with which the pixels 2 having the first color value are to be overwritten. The rectangle 5 thus constructed thus includes all pixels 2 having a pixel marking 3 and is illustrated in FIG. 1c. Optionally, the rectangle 5 may also be set in an enlarged manner by increasing the values of the outermost boundaries 4 by one or several pixels.

FIGS. 2a to 2f depict a further schematic image of a method for processing image data. An image bitmap 1 with N×M pixels 2, the color and transparency values of which are given via an ARGB color code, is depicted.

Figure 2A:
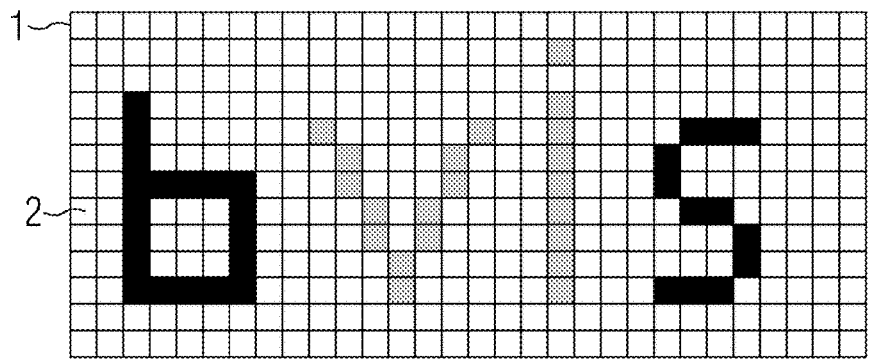
FIG. 2a-2f depict a further schematic image of a method for processing image data.
Figure 2B:
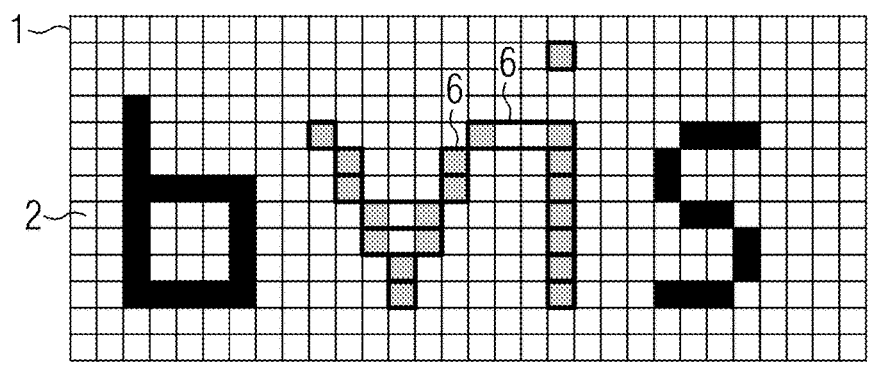

In the image bitmap 1, some pixels 2 have a first color value that, in the illustrated exemplary embodiment, is given by the ARGB color code for the color light-gray. In FIG. 2a, two text letters "b" and "s" are coded in black color, and the letters "v" and "i" are coded in the first color value. The object is now to identify in the image bitmap 1 the pixels 2 having the first color value and to override them with a rectangle having a prespecifiable second color value. In one act, the image bitmap 1 is searched in a row- and column-wise manner for pixel regions in which at least one pixel having the first color value appears, wherein a pixel region is defined in that the spacing between two pixels having the first color value is less than a prespecifiable first value. The first value is selected to be the value 3. In FIG. 2b, the pixel regions 6 found in a row-wise search are marked in the form of an edging.

Figure 2C:
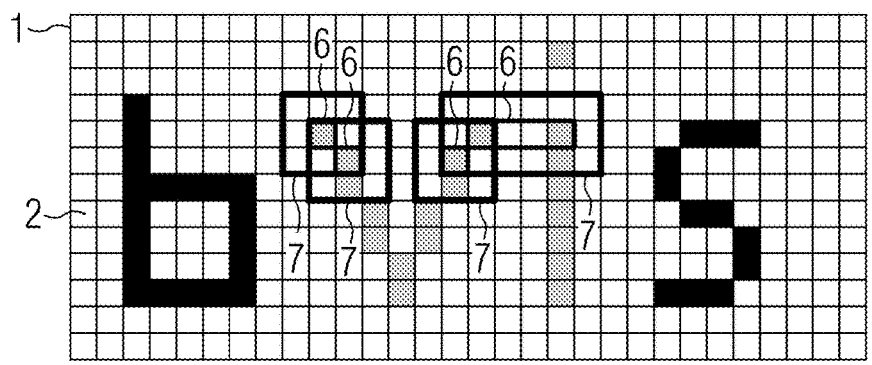

In another act, when a pixel region 6 having the first color value is found, a first rectangle 7 is constructed, which completely encloses the pixel region 6, wherein the spacing from the borders of the first rectangle 7 to the borders of the pixel region 6 may take a prespecifiable second value. In the present exemplary embodiment, the second value was selected to be the value 1. The first rectangle 7 entirely encloses the pixel region 6 and is, in terms of its height and width, larger than the pixel region 6 by in each case 1 pixel. The two method acts are repeated until the image bitmap 1 has been searched completely and all first rectangles 7 are defined. FIG. 2c illustrates the formation of first rectangles 7 for selected pixel regions 6.

Figure 2D:
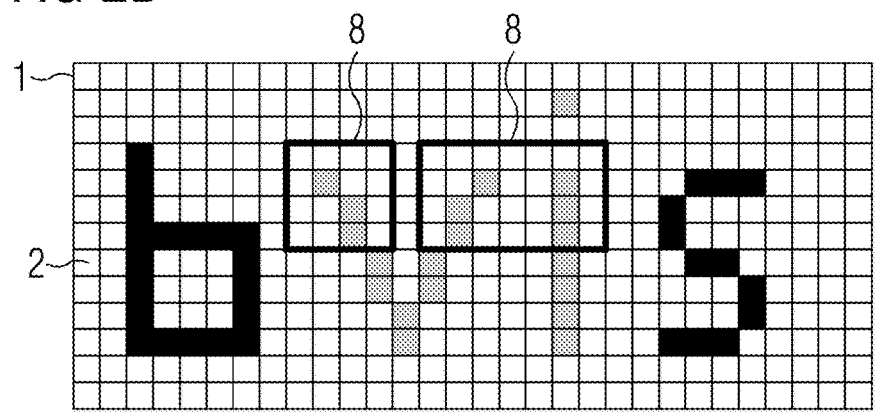

All first rectangles 7 having an overlap in the form of common pixels 2 are then merged with one another and combined to form second rectangles 8. Merging with one another in this case is to adopt the maximum dimensions, such that the outermost left, right, upper, and lower boundaries are ascertained from the two first rectangles 7 that have been combined, and a new rectangle 8 is constructed therefrom. The result of combining the first rectangles 7 from FIG. 2c to form second rectangles 8 is depicted in FIG. 2d. If the image bitmap 1 contains further overlapping first rectangles 7, these are thus combined to form second rectangles 8 until no further overlaps of first rectangles 7 exist. For the sake of clarity, FIGS. 2c and 2d depict only the combination processes for selected first rectangles 7.

Taking into account all formable first rectangles 7 on the basis of the found pixel regions 6 of FIG. 2b leads to the combination of overlapping second rectangles 8 to form third rectangles until no further overlaps of second rectangles 8 exist.

Figure 2E:
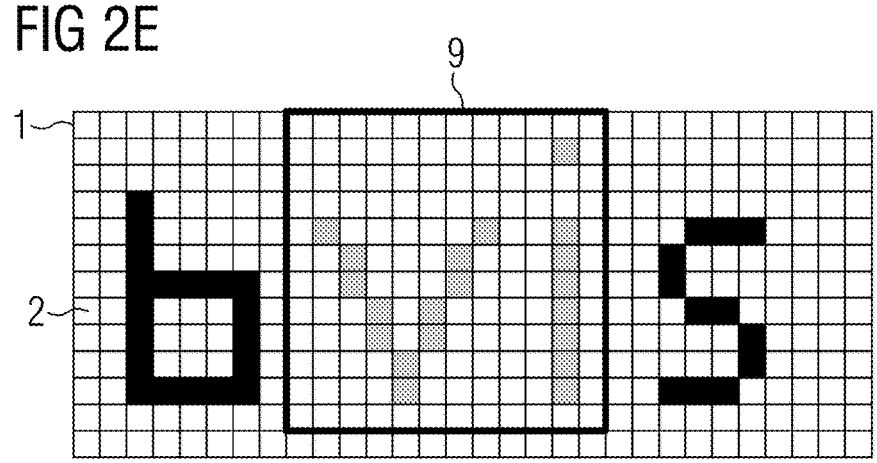
Figure 2F:
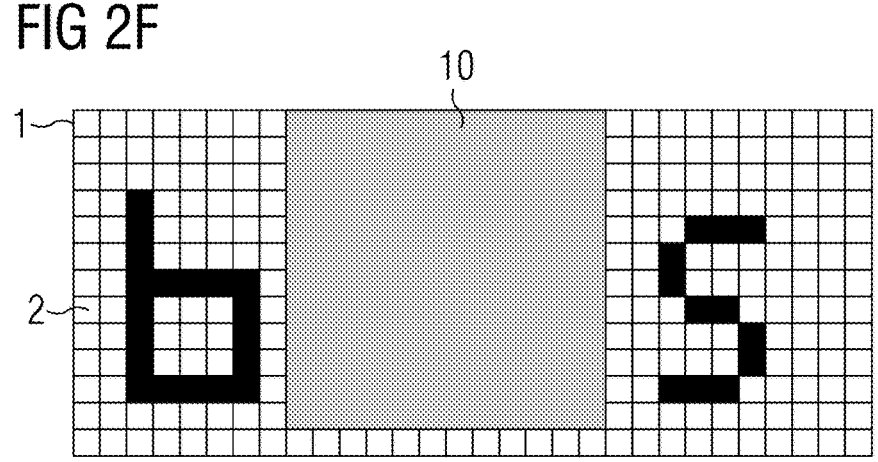

This method of combining overlapping rectangles is continued until no further overlaps of rectangles exist. FIG. 2e illustrates the ultimately obtained rectangle 9. In an additional act, the pixel color values of the ultimately obtained rectangle 9 are overwritten with a prespecifiable second color value. FIG. 2f depicts the result of the anonymization of the image bitmap 1 with an anonymized pixel region 10.

Figure 3A:
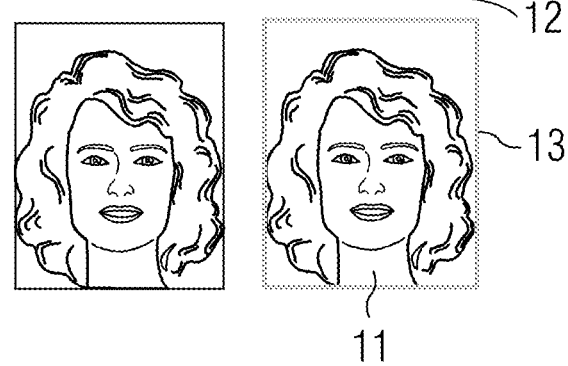
FIG. 3a-3b depict a further schematic image of a method for processing image data.
Figure 3B:
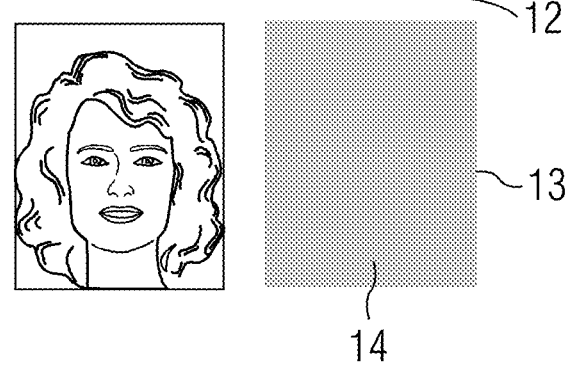

FIGS. 3a and 3b depict a further schematic image of a method for processing image data. FIG. 3a depicts a detail of a Word document that includes a marked table section 11 that has a light-gray border, a text module 12 in a light-gray color, and a light-gray frame 13 of a photo 14. The application of the method acts, which has been explained with respect to FIGS. 2a to 2f from this exemplary embodiment, ultimately results in anonymization as illustrated in FIG. 3b, by overwriting the table section 11, the text module 12 and the frame 13 with a prespecifiable second color value.

A technical implementation of the search procedure for the row-and column-wise searching of the image bitmap for pixel regions in which at least one pixel having a prespecifiable color value appears may be based on the following principles. The pixel color values of the entire image bitmap are converted for example to a one-dimensional character string. The color value for which a search is carried out is likewise converted to a character string. By using character strings, the application of known string search algorithms is permitted, which are provided for example with the Windows operating system and .NET Framework. A search with what are known as "Regular Expressions," which are supported by Microsoft .NET Framework, have proven to be very efficient. The use of a Windows operating system or .NET Framework, however, does not represent a precondition for the implementation of the algorithm. To the extent that primarily text information is intended to be anonymized, is it is recommended that in fact a higher value (for example, 60) is selected as a prespecifiable first value that indicates the spacing between two pixels having the prespecifiable color value. As a result, larger pixel regions (for example, entire words) are captured, as a result of which the number of rectangles that are to be constructed and to be combined is significantly reduced. Attempts by the applicant for anonymization of a 1600×900 image bitmap gave a runtime of less than 50 ms.

Furthermore, it is recommended for the practical application to select in fact a higher value (for example, 5) for the spacing from the borders of a first rectangle to the borders of the pixel region. The result of this is that, for example, isolated points of a letter (for example, in the letters "ö" or "ü") are merged with the base body of the letter ("o," "u").

Examination as to whether rectangles overlap, and thus may be merged, may be implemented likewise effectively using Windows operating system functions (e.g., Rectangle.Intersect, Rectangle.Union).

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for processing image data, the method comprising:
providing image data by an image bitmap comprising pixels, wherein each pixel has exactly one pixel color value out of a plurality of color values;
identifying, by a hardware processor by row- and column-wise searching of the image bitmap, pixel regions in which at least one pixel with a first color value of the plurality of color values appears, wherein a pixel region is defined in that a spacing between two pixels having the first color value is less than a prespecifiable first value;
ascertaining, by the hardware processor, outermost left, right, upper, and lower boundaries of each pixel region, wherein the boundaries are defined as corners of a respective rectangle;
constructing a first rectangle that completely encloses each pixel region;
selectively combining overlapping first rectangles to form one or more second rectangles until no further overlaps of the first rectangles exists, and continuing combining overlapping rectangles until no further overlaps of rectangles exist; and
encrypting, by the hardware processor, the image data to hide sensitive information within the image data from an unauthorized person by overwriting, by the hardware processor, an area of the one or more ultimately combined rectangles with a prespecifiable second color value different from the first color value.

2. The method as claimed in claim 1, wherein the pixel spacing indicates the row and column spacing of the pixels having the first color value.

3. The method as claimed in claim 2, wherein each first rectangle is larger than the enclosed pixel region by at least one pixel in terms of a height and a width of the first rectangle.

4. The method as claimed in claim 3, wherein the pixel color value is given by an ARGB color value.

5. The method as claimed in claim 2, wherein the pixel color value is given by an ARGB color value.

6. The method as claimed in claim 1, wherein each first rectangle is larger than the enclosed pixel region by at least one pixel in terms of a height and a width of the first rectangle.

7. The method as claimed in claim 1, wherein the pixel color value is given by an ARGB color value.

8. The method as claimed in claim 1, wherein the overlapping first rectangles are combined to form one or more second rectangles until no further overlaps of the first rectangles exists, and the overlapping rectangles are continually combined until no further overlaps of rectangles exist.

9. The method as claimed in claim 8, wherein each first rectangle is larger than the enclosed pixel region by at least one pixel in terms of a height and a width of the first rectangle.

10. The method as claimed in claim 9, wherein the pixel color value is given by an ARGB color value.

11. The method as claimed in claim 8, wherein the pixel color value is given by an ARGB color value.

* * * * *